United States Patent
Kanai et al.

(10) Patent No.: US 9,586,563 B2
(45) Date of Patent: Mar. 7, 2017

(54) AUTONOMOUS MOVING APPARATUS AND AUTONOMOUS MOVEMENT SYSTEM

(71) Applicant: Hitachi, Ltd., Tokyo (JP)

(72) Inventors: Masaki Kanai, Tokyo (JP); Masatsugu Arai, Tokyo (JP); Ryoko Ichinose, Tokyo (JP); Yukihiko Ono, Tokyo (JP)

(73) Assignee: Hitachi, ltd., Tokyo (JP)

( * ) Notice: Subject to any disclaimer, the term of this patent is extended or adjusted under 35 U.S.C. 154(b) by 9 days.

(21) Appl. No.: 14/420,773

(22) PCT Filed: Sep. 28, 2012

(86) PCT No.: PCT/JP2012/075187
§ 371 (c)(1),
(2) Date: Feb. 10, 2015

(87) PCT Pub. No.: WO2014/049856
PCT Pub. Date: Apr. 3, 2014

(65) Prior Publication Data
US 2015/0239436 A1    Aug. 27, 2015

(51) Int. Cl.
*B60T 7/12*    (2006.01)
*B60T 7/08*    (2006.01)
(Continued)

(52) U.S. Cl.
CPC ....... *B60T 7/12* (2013.01); *B60T 7/08* (2013.01); *B60T 7/18* (2013.01); *B60T 8/00* (2013.01);
(Continued)

(58) Field of Classification Search
CPC .............. B60T 7/12; B60T 8/17; G05D 1/021
(Continued)

(56) References Cited

U.S. PATENT DOCUMENTS

2007/0291130 A1* 12/2007 Broggi ................. G01S 17/023
                                                                      348/218.1
2008/0277237 A1* 11/2008 Ruhringer ............. F15B 15/261
                                                                      192/220.2
(Continued)

FOREIGN PATENT DOCUMENTS

CN              2064734 U        10/1990
CN           102269994 A        12/2011
(Continued)

OTHER PUBLICATIONS

International Search Report in PCT/JP2012/075187, dated Oct. 23, 2012.
(Continued)

*Primary Examiner* — John Q Nguyen
*Assistant Examiner* — Anshul Sood
(74) *Attorney, Agent, or Firm* — Mattingly & Malur, PC

(57) ABSTRACT

An autonomous moving apparatus and an autonomous movement system has a configuration which prevents disabled autonomous moving apparatuses from traveling unexpectedly during collection. An autonomous moving apparatus 1 includes a wheel locking unit 116 which locks the wheels at the time of stop, a manipulation unit 119 which is provided at a location where manipulation thereof is enabled from the outside of the autonomous moving apparatus 1, and a wheel lock releasing unit 118 which releases the lock of the wheels when the manipulation unit 119 is manipulated by force from the outside. In addition, the wheel lock releasing unit 118 releases the lock of the wheels when force equal to or more than a predetermined value is applied to the manipulation unit 119 and maintains the lock of the wheels when the force applied to the manipulation unit 119 is less than the predetermined value.

14 Claims, 13 Drawing Sheets

(51) Int. Cl.
*B60T 8/00* (2006.01)
*B60T 7/18* (2006.01)
*B60T 8/17* (2006.01)
*G05D 1/02* (2006.01)
*G08G 1/16* (2006.01)

(52) U.S. Cl.
CPC ............... *B60T 8/17* (2013.01); *G05D 1/021* (2013.01); *G08G 1/16* (2013.01); *Y10S 901/01* (2013.01)

(58) Field of Classification Search
USPC .......................................................... 701/23
See application file for complete search history.

(56) References Cited

U.S. PATENT DOCUMENTS

2010/0094499 A1* 4/2010 Anderson ............ G05D 1/0088
701/23
2011/0301800 A1 12/2011 Furuno et al.
2012/0296567 A1* 11/2012 Breed .................... G01C 21/26
701/468

FOREIGN PATENT DOCUMENTS

| JP | 61-46760 | 3/1986 |
| JP | 63-066612 | 3/1988 |
| JP | 01-205995 | 8/1989 |
| JP | 05-131922 | 5/1993 |
| JP | 6-18173 | 3/1994 |
| JP | 3059543 | 3/1999 |
| JP | 2001-030772 | 2/2001 |
| JP | 2010-017428 | 1/2010 |
| JP | 2010-254070 | 11/2010 |

OTHER PUBLICATIONS

Translation of Chinese Office Action received in corresponding Chinese Application No. 201280075372.X dated May 11, 2016.

* cited by examiner

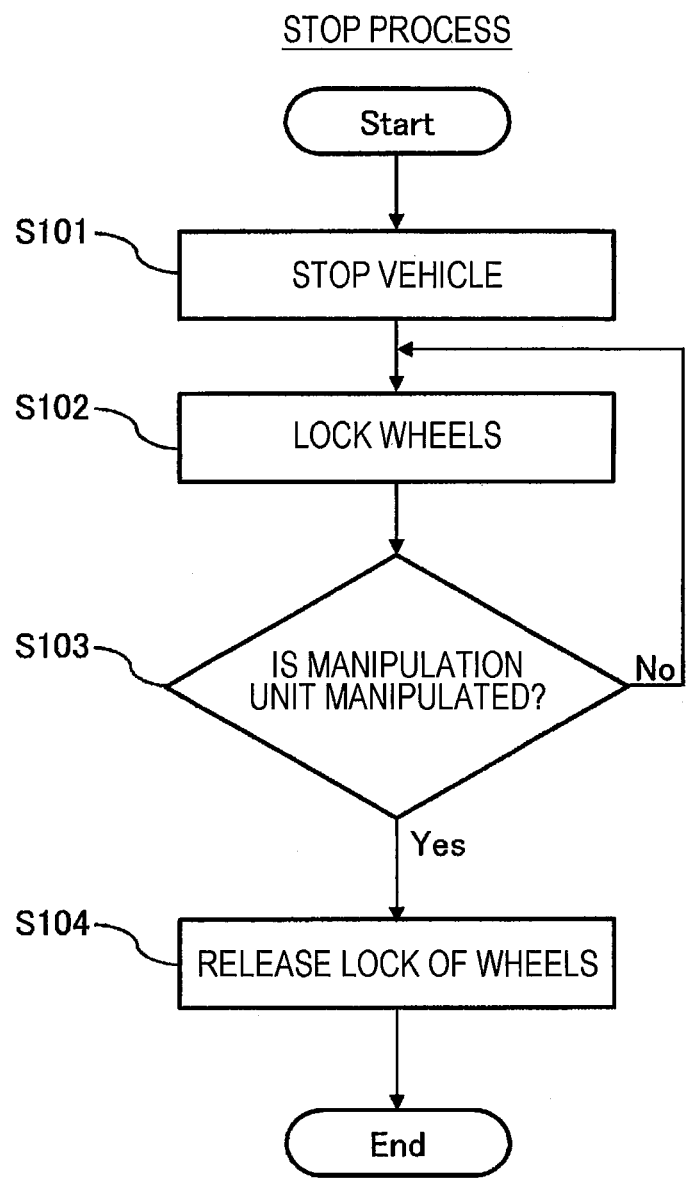

FIG. 6

| | FAILURE PART | STOP POSITION | STOP MECHANISM | COLLECTION METHOD |
|---|---|---|---|---|
| 601 | WIRELESS DEVICE | ROAD SHOULDER | BRAKING UNIT/WHEEL LOCKING UNIT | TOWING |
| 602 | ENVIRONMENT SENSOR/BATTERY | THE SPOT | BRAKING UNIT/WHEEL LOCKING UNIT | TOWING |
| 603 | DRIVING UNIT | THE SPOT | BRAKING UNIT/WHEEL LOCKING UNIT | LOADING |
| 604 | BRAKING UNIT | THE SPOT | WHEEL LOCKING UNIT | LOADING |
| 605 | WHEEL LOCKING UNIT | ROAD SHOULDER/ THE SPOT | BRAKING UNIT | LOADING |

FIG. 7
(a)
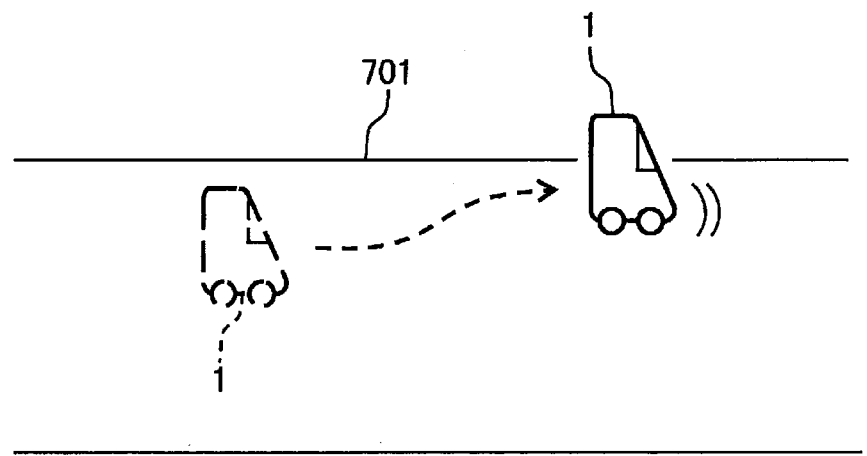
(b)
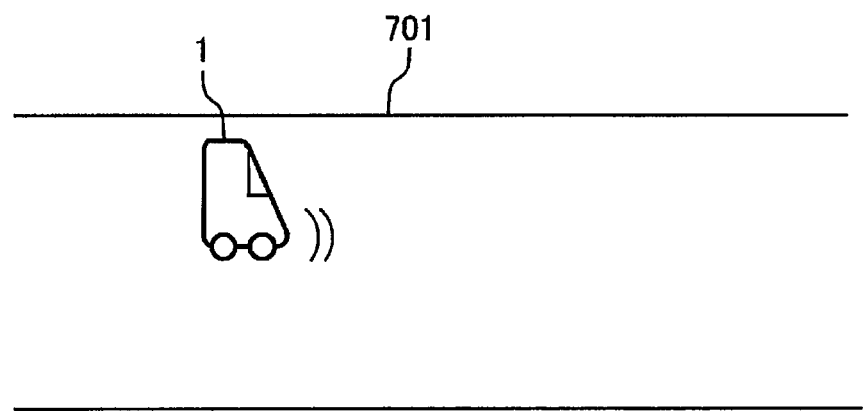

(a)　　　　　　　　　　　　(b)

AUTONOMOUS MOVING APPARATUS AND AUTONOMOUS MOVEMENT SYSTEM

TECHNICAL FIELD

The present invention relates to technology of an autonomous moving apparatus autonomously moving on the basis of a map and a path and an autonomous movement system.

BACKGROUND ART

Recently, an autonomous movement system which allows a passenger to get on a called autonomous moving apparatus or an autonomous moving apparatus in a waiting state and designate a destination and which enables the passenger to be conveyed to the destination by autonomous travel has been considered as a new autonomous movement system using the autonomous moving apparatus.

Because the autonomous moving apparatus travels in a human living environment, the autonomous movement system needs to ensure the safety of the surroundings. Particularly, a wheel locking device using an electromagnetic brake is generally included, such that wheels can be prevented from being rotated when the autonomous moving apparatus stops on a sloping road.

However, if the wheel locking device is used, the autonomous moving apparatus cannot be easily moved. For this reason, it is not easy to tow and collect the autonomous moving apparatus or move the autonomous moving apparatus to a location where the autonomous moving apparatus does not disturb a passerby.

As an example of correspondence to the above problem, a wheel motor in which rotation of a motor is locked when a vehicle is stopped by a non-excitation actuating electromagnetic brake, but wheels becomes rotation free for the motor by separating a locking member such as a bolt to transmit the torque of the motor to the wheels and the vehicle can be moved using the wheels is disclosed in PTL 1. Further, technology described in PTL 2 transmits the torque from the motor to driving wheels through a worm gear. In addition, in the technology described in PTL 2, an in-pipe traveling vehicle in which the driving wheels are locked when the vehicle is stopped, but the driving wheels are floated from a ground surface by manipulation from the outside, rotatable driven wheels are connected to a ground, and the vehicle can be moved is disclosed.

CITATION LIST

Patent Literature

PTL 1: JP 2001-30772 A
PTL 2: JP 05-131922 A

SUMMARY OF INVENTION

Technical Problem

In the case in which a state of the autonomous moving apparatus changes from a lock state to a travel enabled state using the technologies described in PTL 1 and PTL 2, if the autonomous moving apparatus becomes able to travel once, there is no mechanism for putting a brake on the wheels. For this reason, if the autonomous moving apparatus approaches a slope during movement work of the autonomous moving apparatus, the autonomous moving apparatus can be accelerated or in contrast, the autonomous moving apparatus cannot be stopped when the movement of the autonomous moving apparatus ends. As a result, when a worker is separated from the autonomous moving apparatus during the movement work, unexpected travel may occur. Therefore, the technologies according to the related art are not preferable.

The invention has been made in view of the above circumstances and an object of the invention is to provide an autonomous moving apparatus and an autonomous movement system with a configuration which prevents unexpected travel from occurring.

Solution to Problem

One of preferred modes of the invention for solving the aforementioned problems is as follows. An autonomous moving apparatus provided according to the preferred mode of the invention includes a wheel locking unit which locks wheels, a manipulation unit in which manipulation thereof is enabled from the outside, and a wheel lock releasing unit which releases the lock of the wheels when the manipulation unit is manipulated.

Advantageous Effects of Invention

According to the invention, an autonomous moving apparatus and an autonomous movement system with a configuration which prevents unexpected travel from occurring can be provided.

BRIEF DESCRIPTION OF DRAWINGS

FIG. 5 is a flowchart illustrating an operation sequence when the autonomous moving apparatus is stopped.

FIG. 6 is a summarized table of relations of a failure part, a stop position, a stop mechanism, and a collection method of the autonomous moving apparatus.

FIGS. 7(a) and 7(b) are diagrams illustrating the stop position of the autonomous moving apparatus.

DESCRIPTION OF EMBODIMENTS

Figure 1:
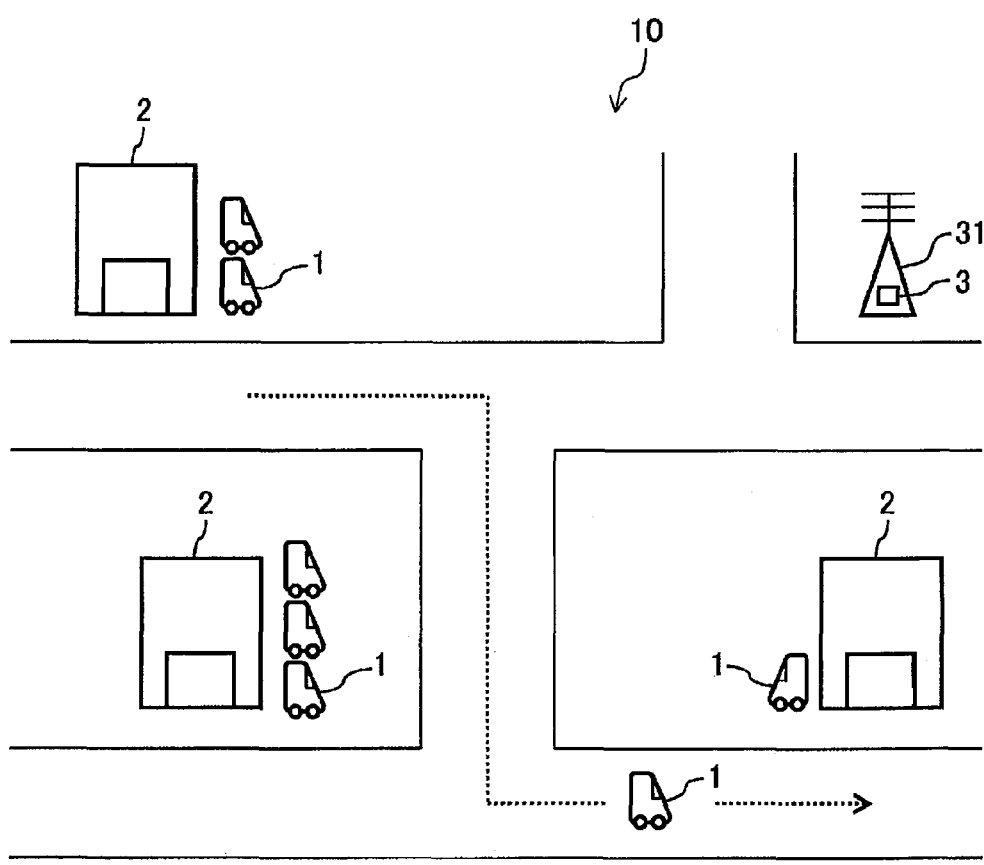
FIG. 1 is a diagram illustrating a configuration example of an autonomous movement system according to this embodiment.

Next, modes (referred to as "embodiments") to carry the invention will be described in detail with reference to the drawings. In the individual drawings, the same components are denoted by the same reference numerals and description thereof is omitted.

In this embodiment, an outline of an autonomous movement system using an autonomous moving apparatus and an example of a process when the autonomous moving apparatus is failed in the system will be described.

[Autonomous Movement System]

FIG. 1 is a diagram illustrating a configuration example of an autonomous movement system according to this embodiment.

An autonomous movement system 10 has autonomous moving apparatuses 1 which convey a passenger to a destination by autonomous travel, main facilities 2 which have spaces in which the autonomous moving apparatuses 1 mainly wait for the passenger, and a control device 3 which is disposed in a control station 31 to recognize a state of the autonomous moving apparatus 1 and transmit vehicle allocation information. The autonomous moving apparatus 1 is an apparatus for one passenger, for example.

Here, the state of the autonomous moving apparatus 1 is a position, a speed, and a remaining battery capacity of the autonomous moving apparatus 1 and information showing whether components are failed in the autonomous moving apparatus 1. In addition, the vehicle allocation information is a waiting position of each autonomous moving apparatus 1, a calling position of the passenger, and a collection position of the disabled autonomous moving apparatus 1 (hereinafter, referred to as a disabled vehicle).

The autonomous moving apparatus 1 maintains a waiting state in an appropriate waiting location designated by the control device 3, such as the main facility 2, when the passenger does not use the autonomous moving apparatus 1. If the passenger calls the autonomous moving apparatus 1, the control device 3 moves the autonomous moving apparatus 1 to a position of the passenger. If the passenger gets on the autonomous moving apparatus 1, sets a destination, and executes guide start manipulation, the autonomous moving apparatus 1 autonomously travels to the destination.

The main facility 2 is assumed as a facility where demand of the autonomous movement system 10 is anticipated to some extent, such as a hospital, an airport, a commercial facility, and an amusement facility. However, the main facility 2 may be a corner of a parking lot of a convenience store and a downtown and a waiting location may be newly set or may be changed according to a use method of the autonomous moving apparatus 1.

The control device 3 receives information regarding the state of the autonomous moving apparatus 1 from the autonomous moving apparatus 1 and transmits new vehicle allocation information of each autonomous moving apparatus 1 to each autonomous moving apparatus 1, on the basis of a position and current vehicle allocation information of each autonomous moving apparatus 1.

When the passenger starts to use the autonomous movement system 10, the passenger gets on the autonomous moving apparatus 1 in a waiting state or calls the autonomous moving apparatus 1 using a reservation terminal included in the main facility 2 or a terminal such as a smart phone possessed by the passenger and gets on the called autonomous moving apparatus 1. If the passenger designates a destination using a display provided in the autonomous moving apparatus 1 and manipulates a guide start button displayed on the display, the autonomous moving apparatus 1 starts movement to a destination designated from a current position by autonomous travel. During the movement, the autonomous moving apparatus 1 guides a current location, a time taken to the destination, and local information around the destination to the passenger appropriately by the display or a sound. If it is confirmed by a weight sensor or a camera that the autonomous moving apparatus 1 has arrived at the destination and the passenger has got off the autonomous moving apparatus 1, the autonomous moving apparatus 1 travels autonomously to a next vehicle allocation position received from the control device 3.

[Autonomous Moving Apparatus]

Figure 2:
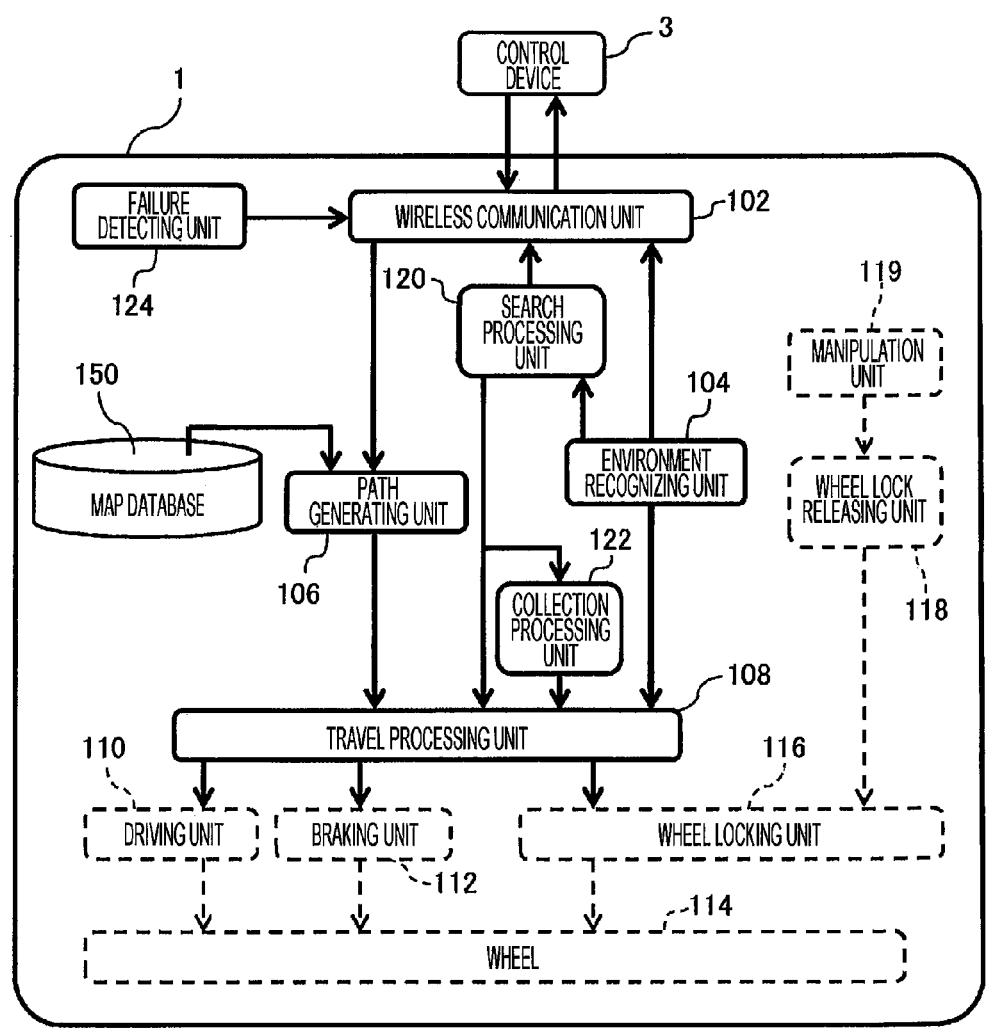
FIG. 2 is a diagram illustrating a configuration example of an autonomous moving apparatus according to this embodiment.

FIG. 2 is a diagram illustrating a configuration example of the autonomous moving apparatus according to this embodiment. In FIG. 2, a solid line shows a portion realized by software and transmission and reception of information. In addition, a broken line shows a mechanical mechanism and action of dynamic force.

The autonomous moving apparatus 1 has a wireless communication unit 102, an environment recognizing unit 104, a path generating unit 106, a travel processing unit (stop processing unit) 108, a driving unit 110, a braking unit 112, wheels 114, a wheel locking unit 116, a wheel lock releasing unit 118, a manipulation unit 119, a search processing unit 120, a collection processing unit 122, a failure detecting unit 124, and a map database 150.

The wireless communication unit 102 performs communication with the control device 3.

The environment recognizing unit 104 performs detection of an own vehicle position or detection of an obstacle, on the basis of environment information.

The path generating unit 106 receives a vehicle allocation instruction from the control device 3 and generates a movement path of an own vehicle from the own vehicle position or information of the map database 150. In addition, the path generating unit 106 generates a track along which the autonomous moving apparatus 1 travels, from information of the obstacle detection acquired from the environment recognizing unit 104 or information of the vehicle allocation position acquired from the control device 3 through the wireless communication unit 102.

Figure 3:
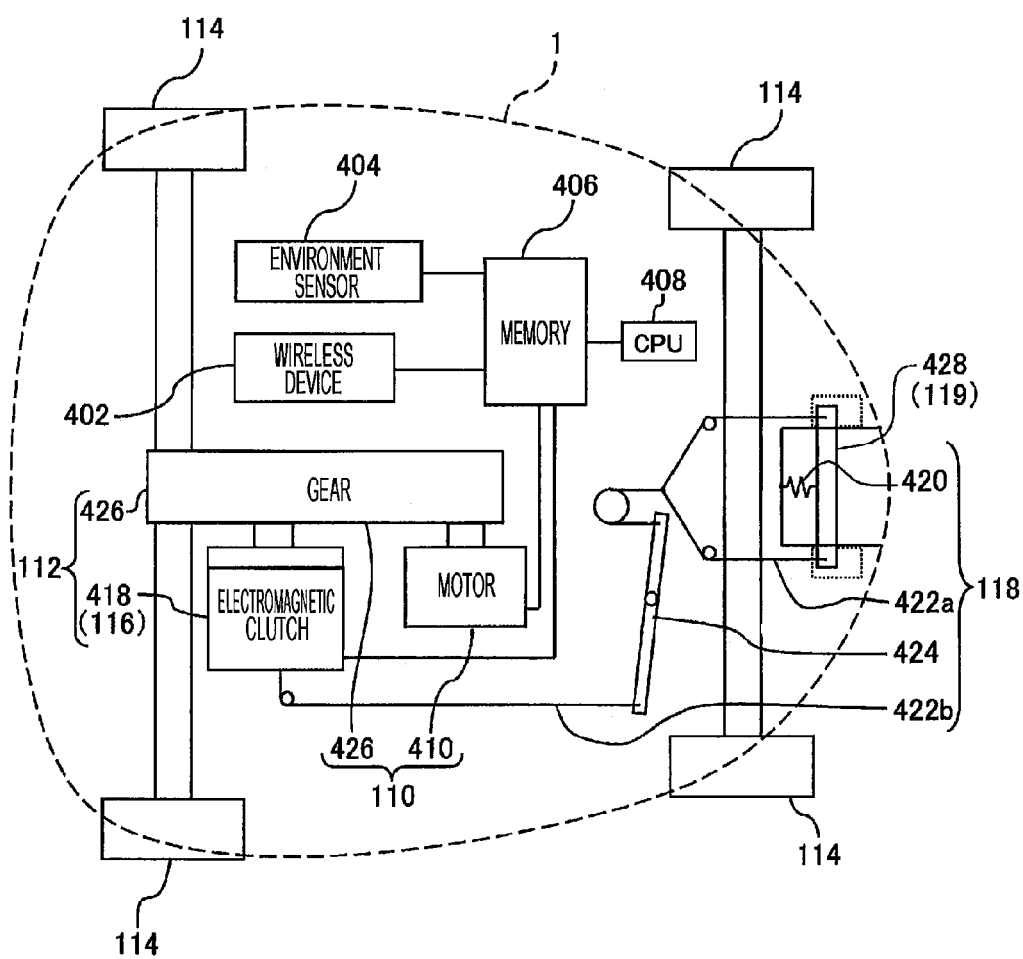
FIG. 3 is a diagram illustrating a specific configuration example of an autonomous moving apparatus according to a first embodiment.

The travel processing unit 108 performs travel control from the generated path or a position of the detected obstacle. The travel processing unit 108 controls a motor 410 (FIG. 3) or a steering not illustrated in the drawings and makes the autonomous moving apparatus 1 move according to the path generated by the path generating unit 106. Meanwhile, the travel processing unit 108 generates state information of the autonomous moving apparatus 1 such as the position or the speed of the autonomous moving apparatus 1, on the basis of information acquired from the environment recognizing unit 104, a rotation amount of the motor 410, and a state of an electromagnetic clutch 418 (FIG. 3). In addition, the travel processing unit 108 transmits the generated state information to the control device 3 through the wireless communication unit 102.

The driving unit 110 drives the wheels 114 according to a command of the travel processing unit 108.

The braking unit 112 puts a brake on the wheels 114 according to a command of the travel processing unit 108.

The wheels 114 are attached to the autonomous moving apparatus 1 and move the autonomous moving apparatus 1.

In addition, the wheels 114 includes driving wheels to which driving force by the motor 410 (FIG. 3) is transmitted and driven wheels to which the driving force is not transmitted. The wheels 114 include a crawler.

The wheel locking unit 116 locks the rotation of the wheels 114 when the autonomous moving apparatus 1 is stopped.

The manipulation unit 119 is provided at a location where manipulation thereof is enabled from the outside of the autonomous moving apparatus 1. If the manipulation unit 119 is manipulated, the wheel lock releasing unit 118 releases the lock of the wheels 114.

The search processing unit 120 receives a command from the control device 3 through the communication unit 102, transmits the command to the travel processing unit 108, and searches the disabled autonomous moving apparatus 1. In addition, the search processing unit 120 transmits a search result to the control device 3 and receives an instruction from the control device 3. A search process will be described in detail below.

If the collection processing unit 122 receives notification showing that the disabled vehicle has been discovered from the search processing unit 120, the collection processing unit 122 executes a process for collecting the disabled vehicle, through the travel processing unit 108, on the basis of a position of the disabled vehicle notified from the search processing unit 120. A collection process will be described in detail below.

If the failure detecting unit 124 detects the failure of the own vehicle, the failure detecting unit 124 notifies the control device 3 that the failure has been detected and notifies the control device 3 of a failure part. The failure detecting unit 124 monitors the rotation amount of the motor 410 or the state of the electromagnetic clutch 418 (FIG. 3), detects the failure of the autonomous moving apparatus 1, and specifies the failure part.

The map database 150 holds map information of a range in which the autonomous movement system 10 is operated.

FIG. 3 is a diagram illustrating a specific configuration example of the autonomous moving apparatus according to the first embodiment.

The autonomous moving apparatus 1 has a wireless device 402, an environment sensor 404, a memory 406, a central processing unit (CPU) 408, a motor 410, an electromagnetic clutch 418, a knob 428, a spring 420 to return the knob 428 to an initial position, wires 422a and 422b, a lever mechanism 424, and a gear 426.

The wireless device 402 performs wireless communication with the control device 3 and transmits vehicle allocation position information from the control device 3 to the memory 406 or transmits information of an own position calculated on the basis of the environment information acquired by the environment sensor 404 or information regarding the state of the autonomous moving apparatus 1 to the control device 3. In addition, the wireless device 402 corresponds to the wireless communication unit 102 of FIG. 2.

The environment sensor 404 includes sensors such as a global positioning system (GPS), an encoder, a laser range finder, a millimeter wave radar, a supersonic wave sensor, and a camera. The environment sensor 404 performs the position detection of the own vehicle, the detection of the obstacle around the own vehicle, and recognition of a worker or another autonomous moving apparatus 1.

Programs such as the wireless communication unit 102, the environment recognizing unit 104, the path generating unit 106, the travel processing unit 108, the search processing unit 120, the collection processing unit 122, and the failure detecting unit 124 of FIG. 2 are stored in the memory 406 such as read only memory (ROM), these programs are executed by the CPU 408, and the wireless communication unit 102, the environment recognizing unit 104, the path generating unit 106, the travel processing unit 108, the search processing unit 120, the collection processing unit 122, and the failure detecting unit 124 are realized.

The motor 410 is connected to the wheels 114 through the gear 426, generates torque according to the command of the travel processing unit 108 (FIG. 2), and generates driving force in the wheels 114. Here, any component that can transmit the torque from the motor 410 to the wheels 114 may be used as the gear 426. For example, a shaft, a belt, and a chain may be used. Here, the motor 410 and the gear 426 correspond to the driving unit 110 of FIG. 2.

The electromagnetic clutch 418 is a non-excitation actuating device. In the electromagnetic clutch 418, when a current is supplied, the clutch is released by a solenoid (not illustrated in the drawings) and when the current is not supplied, components are pushed by the spring 420 and the clutch is engaged. A rotation shaft of the electromagnetic clutch 418 is connected to a shaft of one gear 426 in the gears 426 (including a plurality of gears) to transmit the torque. In this way, a body of the electromagnetic clutch 418 is fixed on a vehicle body member and the gear 426 in which the electromagnetic clutch 418 has been connected to the shaft cannot rotate when the current is not supplied to the electromagnetic clutch 418. That is, when the autonomous moving apparatus 1 is moved by the torque of the motor 410, that is, the autonomous moving apparatus 1 releases the lock of the wheels 114 for the movement, the current is supplied to the electromagnetic clutch 418 according to a command of the CPU 408, so that the clock of the wheels 114 is released. In addition, in a state in which the autonomous moving apparatus 1 is stopped, the rotation of the wheels 114 is locked without supplying the current to the electromagnetic clutch 418. That is, the electromagnetic clutch 418 corresponds to the wheel locking unit 116 of FIG. 2 that prevents the wheels 114 from being rotated. The wheel locking unit 116 is not limited to the electromagnetic clutch 418 and any component that can prevent the torque from being transmitted from the driving unit 110 (FIG. 2) to the wheels 114 and lock the wheels 114, when the autonomous moving apparatus 1 is stopped, and can release the lock when the autonomous moving apparatus 1 travels may be used. For example, a mechanism for interposing a torque transmission system such as the gear 426 or a belt not illustrated in the drawings and fixing the toque transmission system when the autonomous moving apparatus 1 is stopped may be used as the wheel locking unit 116.

Here, the electromagnetic clutch 418 and the gear 426 correspond to the braking unit 112 of FIG. 2.

The knob 428 is attached to a position where manipulation thereof is enabled from the outside of the autonomous moving apparatus 1 and is connected to the solenoid (not illustrated in the drawings) of the electromagnetic clutch 418 through the wire 422a, the lever mechanism 424, and the wire 422b. That is, the knob 428 is pulled from the outside of the vehicle body, so that force of the same direction as the solenoid is generated in the electromagnetic clutch 418 by the wire 422b, instead of the solenoid. Thereby, the electromagnetic clutch 418 is released. As a result, even though the current is not supplied to the electromagnetic clutch 418, the lock of the wheels 114 can be released. In addition, if pulling of the knob 428 is stopped, the clutch is engaged again by the force of the spring 420 in the electromagnetic clutch 418 and the wheels 114 are locked to be not rotatable. That is, when the knob 428 is being manipulated, the lock of the wheels 114 is released and when the knob 428 is not being manipulated, the wheels 114 are locked. At this time, the knob 428 is also pulled by the wires 422a and 422b and returns to the original position. The knob 428 is preferably attached to a position where the force is easily applied in a movement direction, such that the autonomous moving apparatus 1 is easily moved when the autonomous moving apparatus 1 is towed, such as the same height as the center of gravity of the autonomous moving apparatus 1. However, the present invention is not limited thereto.

In this embodiment, the knob 428 is arranged on a lower side of a front surface of the autonomous moving apparatus 1. However, the knob 428 may be arranged on a rear side.

The lever mechanism 424 is provided between the knob 428 and the wires 422a and 422b connected to the electromagnetic clutch 418 and changes a direction of the force.

Here, the knob 428 corresponds to the manipulation unit 119 of FIG. 2 and the wires 422a and 422b and the lever mechanism 424 correspond to the wheel lock releasing unit 118 of FIG. 2.

Figure 4:
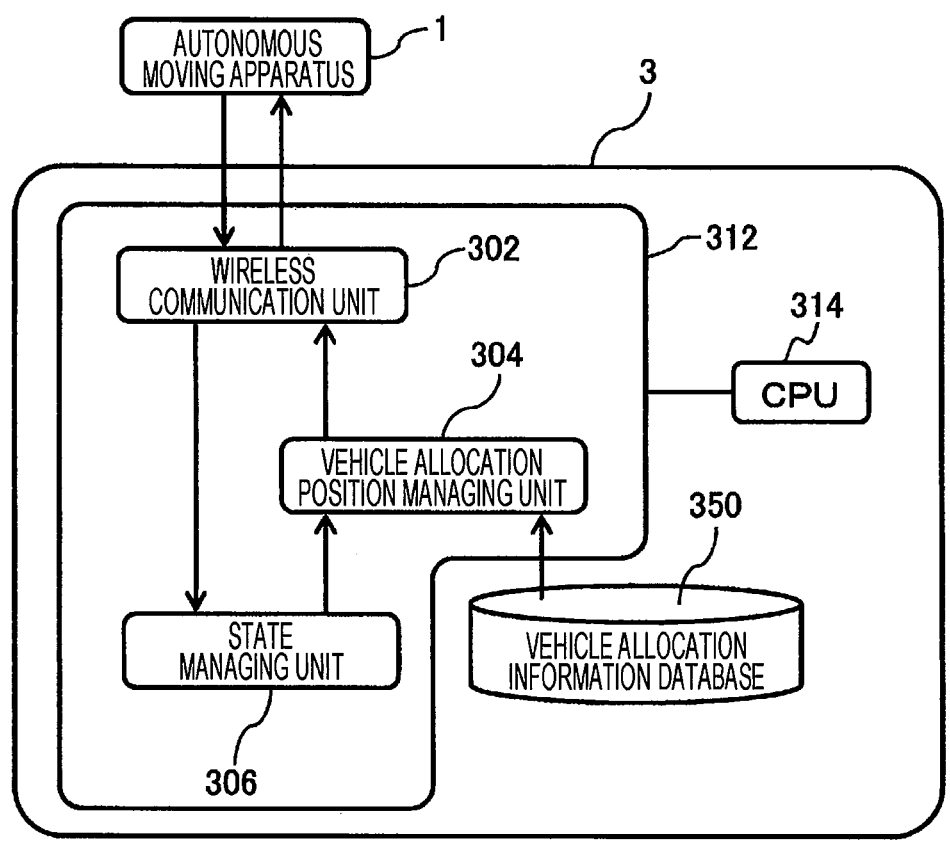
FIG. 4 is a diagram illustrating a configuration example of a control device according to the first embodiment.

FIG. 4 is a diagram illustrating a configuration example of the control device according to the first embodiment.

The control device 3 has a wireless communication unit 302, a vehicle allocation position managing unit 304, a state managing unit 306, and a vehicle allocation information database 350.

The wireless communication unit 302 performs communication with the autonomous moving apparatus 1.

The vehicle allocation position managing unit 304 calculates a new vehicle allocation position of each autonomous moving apparatus 1, on the basis of a state of the autonomous moving apparatus 1 and current vehicle allocation information. Specifically, the vehicle allocation position managing unit 304 receives information from the state managing unit 306 and the vehicle allocation information database 350 and generates vehicle allocation information, on the basis of the number of demanded autonomous moving apparatuses in each main facility (FIG. 1) 2 included in the information and the position of each autonomous moving apparatus 1. The vehicle allocation position managing unit 304 optimizes the vehicle allocation position of each autonomous moving apparatus 1 such that an entire battery consumption amount of the autonomous movement system 10 is minimized, thereby generating the vehicle allocation information. In addition, the vehicle allocation position managing unit 304 transmits the generated vehicle allocation information to the autonomous moving apparatus 1 through the wireless communication unit 302.

The state managing unit 306 stores and manages the state of the autonomous moving apparatus 1. The autonomous moving apparatus 1 transmits the position or the speed of the own vehicle, the remaining battery amount, and the failure information of the autonomous moving apparatus 1 to the wireless communication unit 402 of the control device 3 through the wireless communication unit 102. In addition, if the state managing unit 306 receives the notification showing the occurrence of the failure from the failure detecting unit 124 of the autonomous moving apparatus 1, the state managing unit 306 specifies the position of the disabled vehicle or calculates an existence range of the disabled vehicle and notifies the autonomous moving apparatus 1 (hereinafter, referred to as the collection vehicle) collecting the disabled vehicle of the position or the existence range.

The vehicle allocation information database 350 holds demand information of the autonomous moving apparatus 1 in each main facility 2, which is calculated statistically from a daily use situation of the autonomous movement system 10 in the state managing unit 306.

A program is stored in a hard disk (HD) not illustrated in the drawing, the program is developed to the memory 312 such as random access memory (RAM), the program is executed by the CPU 314, so that the vehicle allocation position managing unit 304 and the state managing unit 306 are realized.

[Stop and Collection Method]

Next, an operation sequence when the autonomous moving apparatus 1 stops and a collection method thereof will be described using FIGS. 5 to 10 in addition to FIGS. 1 to 4.

FIG. 5 is a flowchart illustrating the operation sequence when the autonomous moving apparatus stops.

Here, the "stop" includes stop when the autonomous moving apparatus is failed. However, the "stop" may include stop such as emergency stop when an obstacle blocks a road as well as the stop when the autonomous moving apparatus is failed.

First, if the autonomous moving apparatus 1 is stopped (S101), the wheel locking unit 116 locks the wheels 114 by the mechanism described above (S102).

In state in which the wheels 114 are locked, if the manipulation unit 119 (knob 428) is manipulated (S103→Yes), the wheel lock releasing unit 118 releases the lock of the wheels 114 (S104).

If the manipulation of the manipulation unit 119 is stopped (S103→No), the wheel locking unit 116 locks the wheels 114 again (S102). That is, the wheel lock releasing unit 118 maintains the lock of the wheels 114 by the wheel locking unit 116.

Next, correspondence to a situation where abnormality occurs in the autonomous moving apparatus 1 and the autonomous moving apparatus 1 is stopped by failure in a downtown will be described as a specific example of the stop. Here, it is assumed that the disabled autonomous moving apparatus 1 cannot travel autonomously as long as a failure part is not repaired. For this reason, it is necessary to perform collection work of the disabled vehicle. As a collection destination, a base station of the autonomous moving apparatus 1 or a main facility having a repairing mechanism among the main facilities 2 is exemplified.

The failure detecting unit 124 determines whether the failure occurs, on the basis of whether a signal acquired from the environment sensor 404 or the motor 410 shows an abnormal value. For example, when the failure detecting unit 124 monitors a current flowing through the motor 410 and the current is deviated greatly from a normally output current value (when a target current value of the motor 410 and a current value actually supplied to the motor 410 are greatly different from each other), the travel processing unit 108 determines that the motor 410 is abnormal.

A stop position, a stop mechanism, and a collection method of the autonomous moving apparatus 1 when the failure occurs are different according to a failure part.

FIG. 6 is a summarized table of relations of the failure part, the stop position, the stop mechanism, and the collection method of the autonomous moving apparatus.

For example, as shown by a reference numeral 601, when the wireless device 402 is failed, the environment recognizing unit 104 detects an obstacle or a road shoulder and autonomous travel is enabled. Therefore, the travel processing unit 108 moves the disabled vehicle (autonomous moving apparatus 1) to a shoulder of a road 701 (stop position: road shoulder), as illustrated in FIG. 7(*a*). Then, the travel processing unit 108 stops the disabled vehicle using the braking unit 112 and the wheel locking unit 116 (stop mechanism: braking unit/wheel locking unit). As such, the disabled vehicle is moved to the road shoulder, so that the disabled vehicle can be prevented from disturbing other autonomous moving apparatus 1 or a passerby. The collection method will be described below.

As shown by a reference numeral 602, when the environment sensor 404 or a battery not illustrated in the drawings is failed, the autonomous travel is disabled. Therefore, the travel processing unit 108 stops the disabled autonomous moving apparatus 1 on the spot using the braking unit 112 and the wheel locking unit 116, as illustrated in FIG. 7 (*b*) (stop position: the spot and stop mechanism: braking unit/wheel locking unit).

As shown by a reference numeral 603, when the driving unit 110 is failed, the travel is impossible. For this reason, the travel processing unit 108 stops the autonomous moving apparatus 1 on the spot using the braking unit 112 and the wheel locking unit 116 (stop position: the spot and stop mechanism: braking unit/wheel locking unit).

As shown by a reference numeral 604, when the braking unit 112 is failed, if the autonomous moving apparatus 1 travels continuously, the autonomous moving apparatus 1 may move downhill. For this reason, the travel processing unit 108 stops the autonomous moving apparatus 1 on the spot using the wheel locking unit 116 (stop position: the spot and stop mechanism: wheel locking unit). When the braking unit 112 is failed, it is not preferable that the autonomous moving apparatus 1 travel. For this reason, the travel processing unit 108 stops the autonomous moving apparatus 1 on the spot using the wheel locking unit 116.

As shown by a reference numeral 605, when the wheel locking unit 116 is failed, the following two methods may be considered. (1) When the wheel locking unit 116 is failed in a state in which the wheels 114 are locked, the travel is impossible. For this reason, the travel processing unit 108 stops the autonomous moving apparatus 1 on the spot using the braking unit 112 (stop position: the spot and stop mechanism: braking unit). (2) When the wheel locking unit is failed in a state in which the wheels 114 are not locked, the autonomous travel is possible. For this reason, the travel processing unit 108 moves the autonomous moving apparatus 1 to the road shoulder, on the basis of the information from the environment recognizing unit 104, and stops the autonomous moving apparatus 1, avoiding a sloping road where the vehicle body begins to move when the wheels 114 are not locked (stop position: road shoulder). At this time, the travel processing unit 108 stops the autonomous moving apparatus 1 using the braking unit 112 (a stop mechanism: the braking unit). To stop the autonomous moving apparatus 1, avoiding the sloping road, is performed on the basis of the information from the environment recognizing unit 104.

When a plurality of failure parts exist and the conditions of the stop on the spot and the stop after the movement to the road shoulder overlap each other (for example, the wireless device 402 and the driving unit 110 are failed at the same time), the stop on the spot takes precedence. If the travel processing unit 108 can move the autonomous moving apparatus 1 to the road shoulder and stop the autonomous moving apparatus 1, the travel processing unit 108 takes such measures.

As such, the stop position is selected according to the failure part of the autonomous moving apparatus 1. Specifically, the stop in which an influence on the passerby has been minimally suppressed can be performed by determining whether the autonomous moving apparatus 1 is stopped on the spot or the autonomous moving apparatus 1 is moved to the road shoulder and is then stopped.

Next, the collection method of the disabled autonomous moving apparatus 1 will be described.

The collection method of the disabled autonomous moving apparatus 1 is different according to the failure part.

As shown by the reference numerals 601 and 602, when the wireless device 402, the environment sensor 404, or a battery (not illustrated in the drawings) is failed, collection by towing is performed (collection method: towing). Meanwhile, as shown by the reference numerals 603 to 605, when the driving unit 110, the braking unit 112, or the wheel locking unit 116 is failed, the wheels 114 may not normally rotate and the collection by the towing is impossible. For this reason, the autonomous moving apparatus 1 is loaded onto a carrier such as a truck and collection is performed (collection method: loading). Here, when the disabled autonomous moving apparatus 1 is towed and collection is performed, the collection work is performed by autonomous travel of a different autonomous moving apparatus 1 in the autonomous movement system 10. However, when it is necessary or effective to perform towing by a manned vehicle or towing by other mechanism, such measures may be performed.

Figure 8:
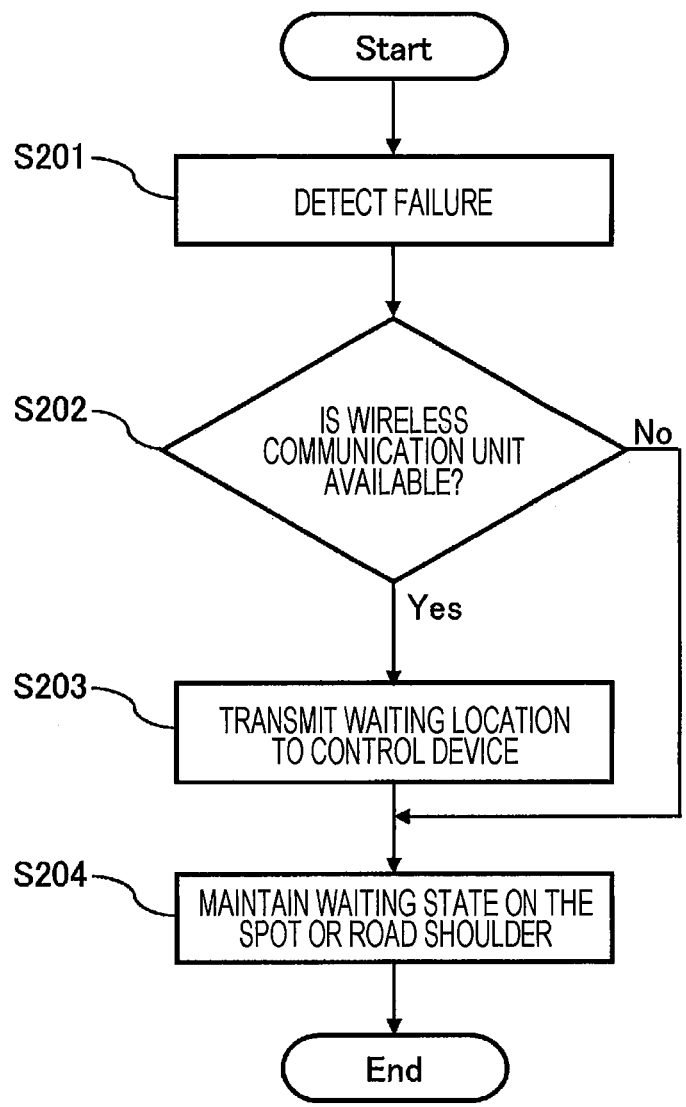
FIG. 8 is a flowchart illustrating an operation sequence when the autonomous moving apparatus is failed.

FIG. 8 is a flowchart illustrating an operation sequence when the autonomous moving apparatus is failed.

FIG. 8 is a flowchart illustrating a specific operation sequence when the stop is stop by failure in the flowchart of FIG. 6.

When the failure occurs, the autonomous moving apparatus 1 notifies the control device 3 of the occurrence of the failure as illustrated by the flowchart of FIG. 8. That is, if the failure detecting unit 124 detects the failure (S201), the failure detecting unit 124 determines whether the wireless communication unit 102 is available (S202).

As a result of step S202, when the wireless communication unit 102 is available (S202→Yes), the travel processing unit 108 transmits a failure waiting location of the own vehicle to the control device 3 (S203). The travel processing unit 108 stops the autonomous moving apparatus 1 on the spot or moves the autonomous moving apparatus 1 to the road shoulder and stops the autonomous moving apparatus 1 according to the failure part and waits for a collection vehicle, as illustrated in FIG. 6 (S204). The transmission of the waiting location to the control device 3 may be performed after the autonomous moving apparatus 1 moves to the waiting location.

As the result of step S202, when the wireless communication unit 102 is not available (S202→No), the travel processing unit 108 makes the autonomous moving apparatus 1 maintain a waiting state on the spot or moves the autonomous moving apparatus 1 to the road shoulder and makes the autonomous moving apparatus 1 maintain the waiting state (S204). When the waiting location is not transmitted to the control device 3, the control device 3 determines a position of the disabled vehicle according to the following method. The state managing unit 306 of the control device 3 always records position information of the autonomous travelling apparatus 3. In addition, if the position cannot be received from the autonomous moving apparatus 1 for a long time or more, the state managing unit 306 of the control device 3 estimates an existence range of the disabled autonomous moving apparatus 1, on the basis of last position information transmitted by the autonomous moving apparatus 1, a passage time after reception of the position information, and vehicle allocation information transmitted to the disabled autonomous moving apparatus 1.

As such, the control device 3 recognizes the existence range of the disabled vehicle by an estimation position based on the position information transmitted from the disabled vehicle or a communication history from the autonomous moving apparatus 1. In addition, the control device 3 sets the autonomous moving apparatus 1 having the low vehicle allocation priority for the worker among the normally functioning autonomous moving apparatuses 1 as the autonomous moving apparatus 1 (collection vehicle) for the collection and allocates the autonomous moving apparatus 1 to the location of the disabled vehicle.

Figure 9:
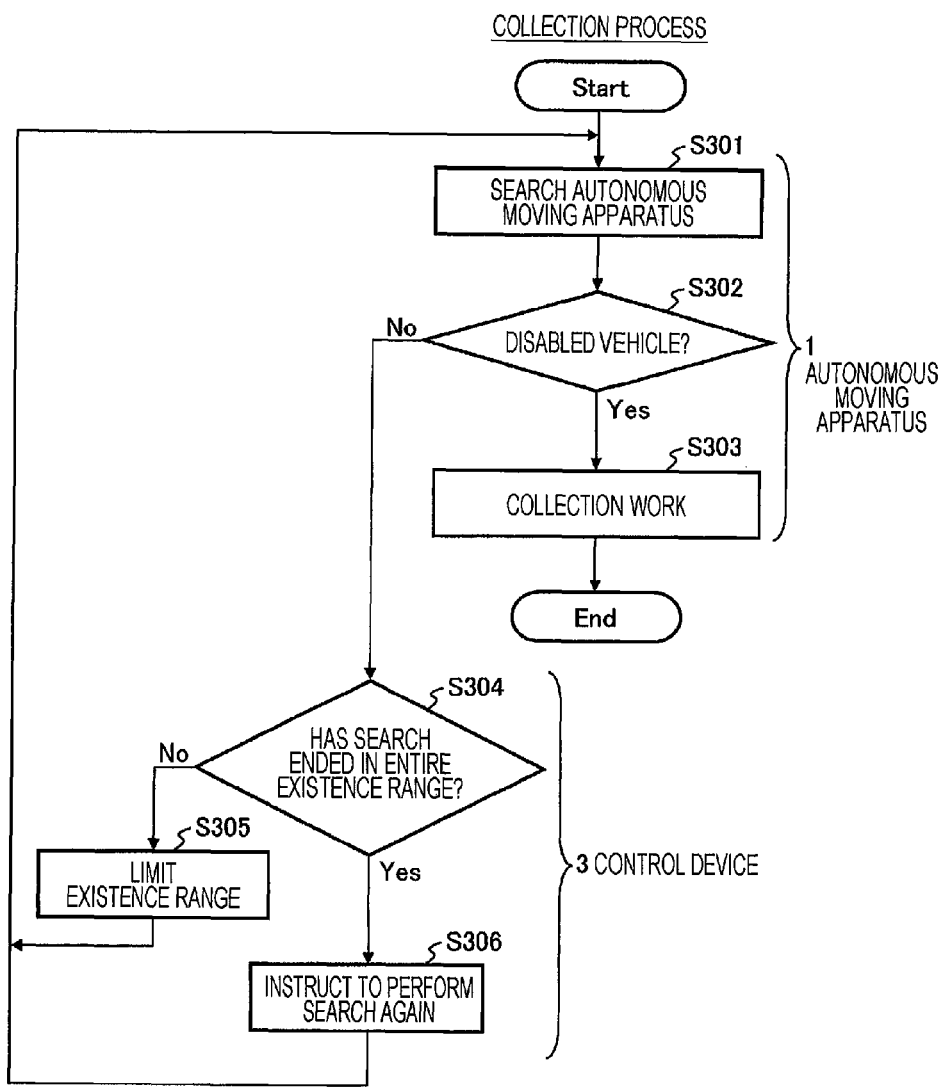
FIG. 9 is a flowchart illustrating a sequence until a collection vehicle starts collection work of a disabled vehicle.

FIG. 9 is a flowchart illustrating a sequence until the collection vehicle starts the collection work of the disabled vehicle.

First, the autonomous moving apparatus 1 allocated as the collection vehicle searches the disabled vehicle, on the basis of existence range information of the disabled vehicle provided from the control device 3.

The search processing unit 120 of the collection vehicle (autonomous moving apparatus 1) searches the autonomous moving apparatus 1 using the environment recognizing unit 104 (S301). At this time, the collection vehicle first searches the autonomous moving apparatus 1 without distinguishing the normality and the failure. As a method of searching the autonomous moving apparatus 1, the processing unit 120 of the collection vehicle stores camera images from various directions or shapes by a laser measurement device. In addition, the processing unit 120 of the collection vehicle determines whether an object is the autonomous moving apparatus 1, using a method of performing matching by a camera or a laser range finder. For example, a method of arranging a reflection plate at a position where it is easy to see the reflection plate from the outside in the autonomous moving apparatus 1, for example, arranging the reflection plate in which a predetermined pattern is drawn on an upper portion of the autonomous moving apparatus 1, acquiring reflection light according to the predetermined pattern from the reflection plate by a camera when the collection vehicle emits light, determining whether the object is the autonomous moving apparatus 1, and searching the autonomous moving apparatus 1 is considered. If this method is used, a power supply of the searched autonomous moving apparatus 1 is not necessary.

Next, the search processing unit 120 of the collection vehicle determines whether the discovered autonomous moving apparatus 1 is the disabled vehicle (S302). For example, a method of turning on a green lamp on a front surface of the normally operating autonomous moving apparatus 1, turning on a red lamp in the case of the disabled vehicle, and recognizing the color by a camera by the search processing unit 120 of the collection vehicle is used. If an electric system is failed, the red lamp is also turned off. However, when the lamp is turned off, the search processing unit 120 of the collection vehicle may determine the corresponding autonomous moving apparatus 1 as the disabled vehicle. In addition to these lamps, a method of displaying the normality and the failure by an electric bulletin board and a display and recognizing the normality and the failure by the search processing unit 120 of the collection vehicle on the basis of the display is also considered. For example, when "being failed" is displayed on the display, the collection vehicle and the general passerby can recognize that the disabled vehicle is being stopped by the failure and safety at the time of passing by the disabled vehicle can be improved.

As a result of step S302, when the autonomous moving apparatus 1 is the disabled vehicle (S302→Yes), the search processing unit 120 notifies the collection processing unit 122 of information showing that the disabled vehicle has been discovered and the position of the disabled vehicle and the collection processing unit 122 performs the collection work of the disabled vehicle (S303).

Figure 10:
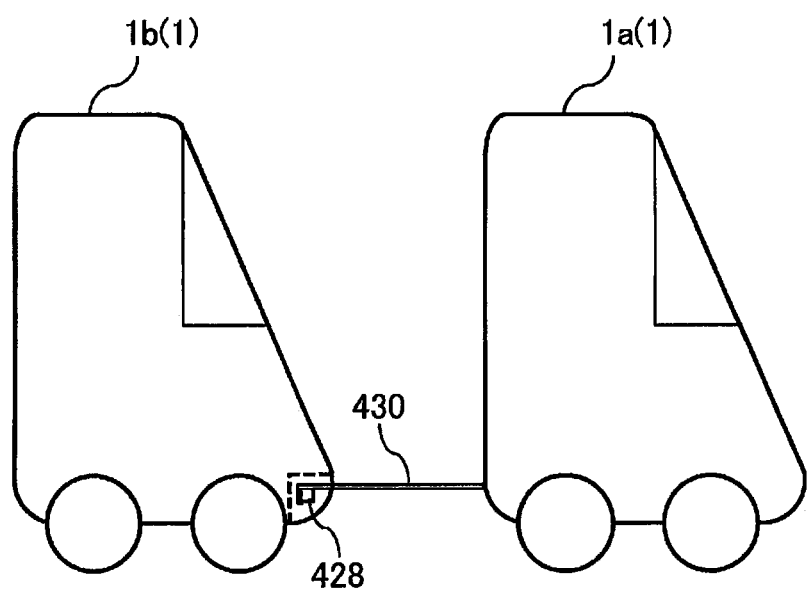
FIG. 10 is a diagram illustrating an aspect of the collection work.

FIG. 10 is a diagram illustrating an aspect of the collection work.

A towing device (towing unit) 430 is attached to the autonomous moving apparatus 1. The towing device 430 is not illustrated in FIG. 3. However, the towing device 430 is arranged in a rear portion of the autonomous moving apparatus 1, as illustrated in FIG. 10. The towing device 430 has a structure in which the collection vehicle is caught in the disabled vehicle when a front end of the towing device 430 is inserted into the knob 428 of the autonomous moving apparatus 1, such that a disabled vehicle 1b (autonomous moving apparatus 1) can be towed. The collection processing unit 122 of a collection vehicle 1a first detects a front surface of the disabled vehicle 1b by a camera not illustrated in the drawings, such that the collection vehicle 1a (autonomous moving apparatus 1) is automatically connected to the disabled vehicle 1b by the towing device 430. Then, the collection processing unit 122 of the collection vehicle 1a arranges the own vehicle in the same direction as the disabled vehicle 1b in front of the disabled vehicle 1b. In addition, the collection processing unit 122 of the collection vehicle 1a moves the own vehicle to the front surface of the disabled vehicle 1b backward, extends the towing device 430, and connects the towing device 430 to the knob 428 of the disabled vehicle 1b. In this state, if the collection vehicle 1a advances and begins to tow the disabled vehicle 1b slowly, the knob 428 is pulled and the lock of the wheels 114 of the disabled vehicle 1b is released. Thereby, the collection vehicle 1a can tow the disabled vehicle 1b. In order to realize such an operation, the force needed to release the lock of the wheels 114 and the force needed to move the autonomous moving apparatus 1 (disabled vehicle 1b) are in a relation of the following expression (1).

$$\text{Force needed to release the lock of the wheels 114 by pulling the knob 428} < \text{force needed to move the autonomous moving apparatus 1} \tag{1}$$

Here, the "force needed to move the autonomous moving apparatus 1" of the right side is determined by rolling resistance or frictional force of the autonomous moving apparatus 1. In this way, if the collection vehicle 1a is stopped or the towing device 430 is erroneously separated from the knob 428, the knob 428 returns to the original state by the structure described above, the wheels 114 are locked again, and the disabled vehicle 1b is stopped. When the towing device 430 is connected, the collection processing unit 122 stops the own vehicle at some distance from the disabled vehicle 1b in front of the disabled vehicle 1b, extends the towing device 430 to the rear side of the collection vehicle 1a using an actuator such as the motor 410, and connects the towing device to the knob 428 of the disabled vehicle 1b.

By providing the towing device 430, the disabled vehicle 1b can be collected without using human hands.

The description returns to the description of FIG. 9.

As the result of step S302, when the autonomous moving apparatus 1 is not the disabled vehicle (S302→No), the collection vehicle transmits information showing that the disabled vehicle 1b cannot be discovered to the control device 3.

The control device 3 that has received the information showing that the disabled vehicle cannot be discovered determines whether the search has ended in an entire existence range (S304).

When the search has not ended in the entire existence range (S304→No), the state managing unit 316 of the control device 3 recognizes the range in which the search has ended, on the basis of the position information of the collection vehicle transmitted from the collection vehicle, and limits the existence range of the disabled vehicle gradually during the search (S305) and the autonomous movement system. 10 returns the process to step S301. That is, the state managing unit 316 of the control device 3 continuously transmits information of the existence range other than the range in which the search has been performed once, to the collection vehicle.

When the search has ended in the entire existence range (S304→Yes), that is, the disabled vehicle cannot be discovered in the entire existence range, the disabled vehicle may not be recognized even though the collection vehicle comes close to the disabled vehicle. For this reason, the control device 3 instructs the collection vehicle to search the disabled vehicle again, on the basis of the first existence range of the disabled vehicle (S306). Or, because the disabled vehicle may exist beyond the first existence range of the disabled vehicle in actuality, the state managing unit 316 of the control device 3 may extend the existence range and instruct the collection vehicle to search the disabled vehicle again.

As such, the collection vehicle is allocated and the search processing unit 120 of the collection vehicle searches the disabled vehicle, so that the autonomous moving apparatus 1 can be used as the collection vehicle, and the disabled vehicle can be collected without using the human hands.

According to this embodiment, the wheel locking unit 116 locking the wheels 114 and the wheel lock releasing unit 118 releasing the lock of the wheels 114 when the manipulation unit 119 (knob 428) is manipulated are provided. Therefore, the movement of the autonomous moving apparatus 1 which is stopped and of which the wheels 114 are locked is facilitated, the wheels 114 are locked in modes other than the manipulation, and safety can be improved.

When the force equal to or more than a predetermined value is applied to the manipulation unit 119, the lock of the wheels 114 is released and when the force applied to the manipulation unit 119 is less than the predetermined value, the lock of the wheels 114 is not released (the lock is maintained). In this way, the autonomous moving apparatus 1 can be prevented from moving unexpectedly.

In addition, when the force equal to or more than the predetermined value is applied to the manipulation unit 119, the lock of the wheels 114 is released and when the force applied to the manipulation unit 119 is less than the predetermined value, the lock of the wheels 114 is not released. In this way, when the brake is put on the collection vehicle, the force applied to the wheel locking unit 116 becomes weaker. Therefore, the wheels 114 of the disabled vehicle are locked naturally and appropriate towing is enabled.

The autonomous moving apparatus 1 autonomously travels independently. Therefore, when the autonomous moving apparatus 1 is stopped by the failure, it is necessary for a worker to go to the failure or stop location and the burden on a work vehicle is big.

According to this embodiment, because the collection using other autonomous moving apparatus 1 is enabled, the burden on the worker can be alleviated.

Second Embodiment

Next, a second embodiment of the present invention will be described with reference to FIGS. 11 and 12.

The second embodiment has a configuration in which, when it is necessary to immediately move a disabled vehicle because an autonomous moving apparatus 1 is stopped at about a center of a road, a road shoulder, or an entrance of a building when the autonomous moving apparatus 1 is stopped by failure, the disabled vehicle can be moved simply by human hands. Because a configuration and a process of an autonomous movement system 10 other than a specific configuration of the autonomous moving apparatus are the same as those of the first embodiment, the drawings and the description are omitted.

Figure 11:
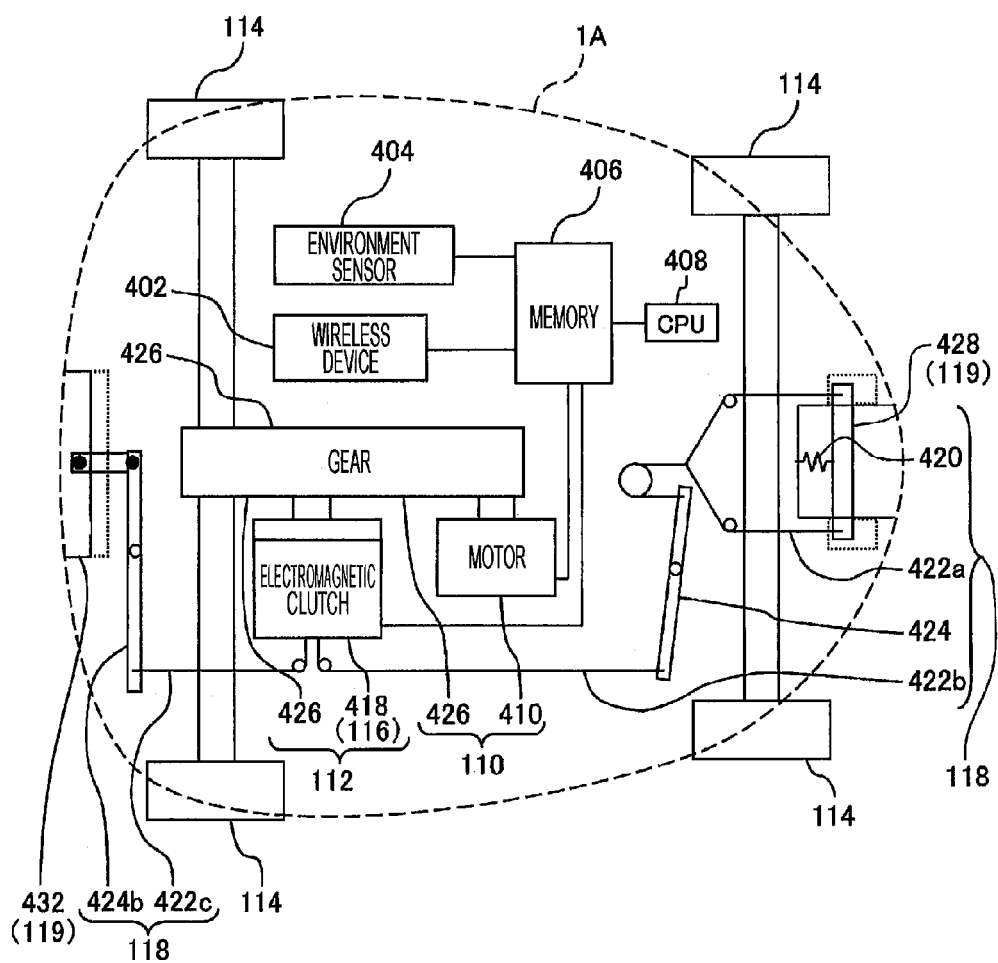
FIG. 11 is a diagram illustrating a specific configuration example of an autonomous moving apparatus according to a second embodiment.

FIG. 11 is a diagram illustrating the specific configuration example of the autonomous moving apparatus according to the second embodiment.

In FIG. 11, the same components as those of FIG. 3 are denoted with the same reference numerals and the description thereof is omitted.

In an autonomous moving apparatus 1A according to the second embodiment, a button 432 of a rear portion of the autonomous moving apparatus 1A is arranged as a manipulation unit 119 (FIG. 2), in addition to the configuration of the autonomous moving apparatus 1 according to the first embodiment. In addition, a lever mechanism 424b and a wire 422c are provided as a configuration associated with the button 432. That is, a knob 428 corresponds to the manipulation unit 119 (FIG. 2) and wires 422a and 422b and a lever mechanism 424 correspond to a wheel lock releasing unit 118 (FIG. 2). In addition, the button 432 corresponds to the manipulation unit 119 and the lever mechanism 424b and the wire 422c correspond to the wheel lock releasing unit 118.

The button 432 is arranged at a position where manipulation thereof is enabled from the outside of the rear portion of the autonomous moving apparatus 1A. The button 432 is connected to a component in which an electromagnetic clutch 418 is operated by a solenoid (not illustrated in the drawings), through the lever mechanism 424b and the wire 422c. That is, the button 432 is pressed from the outside of the autonomous moving apparatus 1A, so that force of the same direction as the solenoid is generated in the electromagnetic clutch 418 by the wire 424c, instead of the solenoid, even though a current is not supplied to the electromagnetic clutch 418, and the clutch can be released. Thereby, a worker presses the button 432 so that lock of wheels 114 can be released.

In addition, if the worker stops pressing the button 432, the clutch is engaged again by force of a spring (not illustrated in the drawings) in the electromagnetic clutch 418 and the wheels 114 are locked to be not rotatable. At this time, the button 432 is also returned to an original position by the wire 422c. The button 432 is preferably attached to a position where the force is easily applied in a movement direction of the autonomous moving apparatus 1A, such as the same height as the center of gravity of the autonomous moving apparatus 1A.

A situation in which abnormality occurs in the autonomous moving apparatus 1A having the above configuration and the autonomous moving apparatus 1A is stopped by failure is considered. As described in the first embodiment, when the autonomous moving apparatus 1A is stopped by the failure and the autonomous travel is possible, the autonomous moving apparatus 1A is stopped after movement to the road shoulder and when the autonomous travel is impossible, the autonomous moving apparatus 1A is stopped on the spot. When the autonomous moving apparatus 1A is stopped on the spot or the road shoulder, this may disturb a passerby or other autonomous moving apparatus 1A according to a stop position and it may be necessary to push the autonomous moving apparatus 1A and move the autonomous moving apparatus 1A by several meters. At this time, the autonomous moving apparatus cannot be moved in a state in which the wheels 114 are locked.

Figure 12:
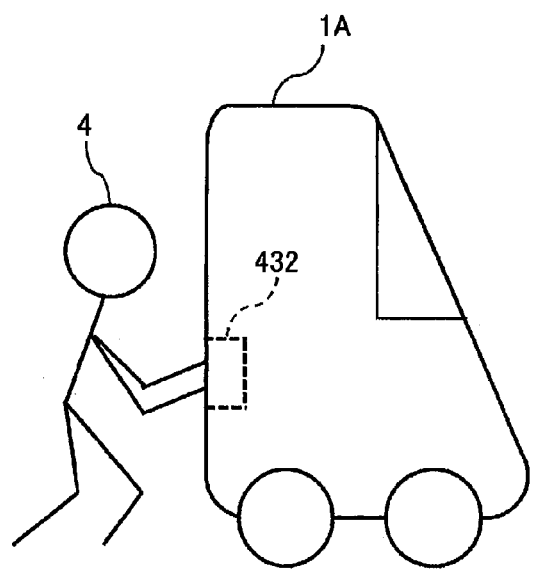
FIG. 12 is a diagram illustrating an aspect of movement of the autonomous moving apparatus according to the second embodiment.

In this case, as illustrated in FIG. 12, a worker 4 presses the button 432 and pushes the autonomous moving apparatus 1A, so that the autonomous moving apparatus 1A can be moved at the same time as releasing of the lock of the wheels 114 of the autonomous moving apparatus 1A. In order to realize such an operation, the force needed to release the lock of the wheels 114 and the force needed to move the autonomous moving apparatus 1A are in a relation of the following expression (2).

$$\text{Force needed to release the lock of the wheels 114 by pressing the button 432} < \text{force needed to move the autonomous moving apparatus } 1A \quad (2)$$

Here, the "force needed to move the autonomous moving apparatus 1A" is determined by the same way as that of the first embodiment.

When the movement of the autonomous moving apparatus 1A ends, if the worker 4 releases the button 432, the wheels 114 are locked again by the structure described above. By this structure, occurrence of when the autonomous moving apparatus 1A is separated from hands of the worker 4 and travels unexpectedly can be prevented. In addition, even in the case in which the autonomous moving apparatus 1A may move downhill and is accelerated, regardless of the intention of the worker 4, the wheels 114 are locked immediately after the hands of the worker 4 are separated from the button 432 and the autonomous moving apparatus 1A is stopped. Therefore, safety can be improved.

In the second embodiment, the knob 428, the wire 422$a$, the lever mechanism 424, and the wire 422$b$ of FIG. 11 may be omitted.

According to the second embodiment, when the immediate movement is necessary because the autonomous moving apparatus 1A is stopped at about the center of the road, the road shoulder, or the entrance of the building, the disabled autonomous moving apparatus 1A can be moved simply by the human hands.

Third Embodiment

Next, a third embodiment of the present invention will be described with reference to FIGS. 13($a$) and 13($b$).

When anyone can move an autonomous moving apparatus 1A simply by pressing a button 432 of a rear portion of the autonomous moving apparatus 1A, the autonomous moving apparatus 1A may be stolen. For this reason, in the third embodiment, the case in which security for manipulation of the button 432 is raised is considered.

Figure 13:
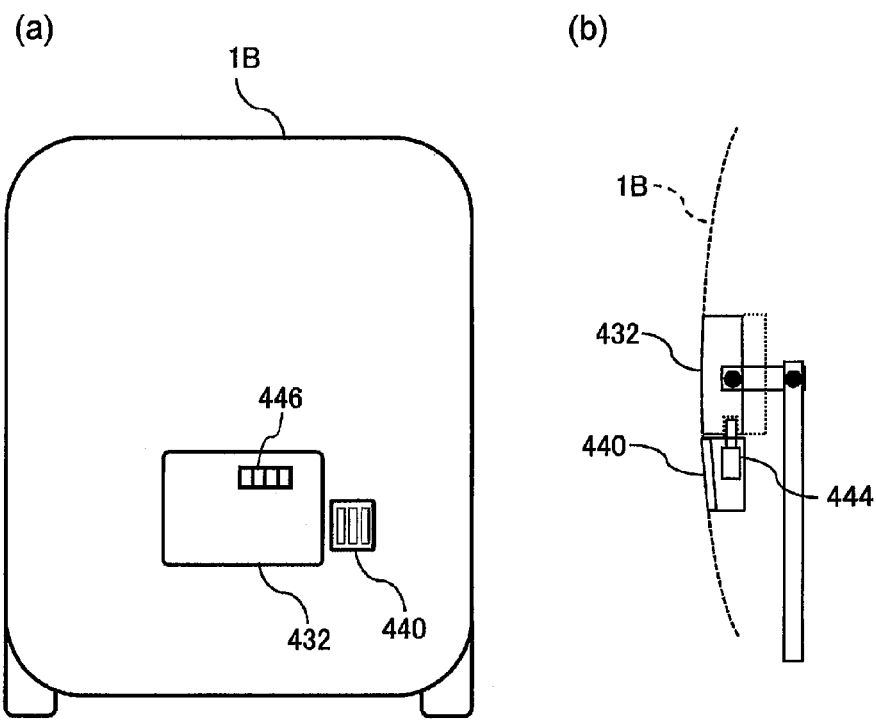
FIGS. 13(a) and 13(b) are diagrams illustrating a security unit according to a third embodiment.

FIGS. 13($a$) and 13($b$) are diagrams illustrating a security unit according to the third embodiment.

FIG. 13($a$) is a diagram illustrating an autonomous moving apparatus according to the third embodiment when viewed from a rear side. As illustrated in FIG. 13($a$), a door 440 with a dial lock is provided beside the button 432. In addition, FIG. 13($b$) is a perspective view illustrating a rear portion of an autonomous moving apparatus 1B when viewed from an upper side. If a worker opens the door 440 with the dial lock, a slide pin 444 to be manipulatable manually is provided in the door 440. The slide pin 444 is engaged with a part of the button 432 to disturb the movement of the button 432.

The worker inputs a password by turning a dial 446 provided in the outside of the door 440 with the dial lock. If the password is matched, the lock of the door 440 with the dial lock is released. After the lock is released, the worker opens the door 440 with the dial lock and moves the slide pin 444 to a position where movement of the button 432 is not disturbed, so that the button 432 is manipulatable.

The door 440 with the dial lock, the slide pin 444, and the dial 446 correspond to the security unit.

In addition, because a configuration and a process of an autonomous movement system 10 other than the door 440 with the dial lock, the slide pin 444, and the dial 446 are the same as those of the second embodiment, the drawings and the description are omitted.

In this way, the button 432 can be manipulated only if a correct password is input to the door 440 with the dial lock and the slide pin 444 moves. Therefore, anyone cannot move the autonomous moving apparatus 1B easily. That is, security is improved. However, the worker can obtain the password relatively easily by contacting a call center using a phone number of the call center written in the autonomous moving apparatus 1B. At this time, the password may be guided in exchange for a social position or contact information of a person who asks for the password, to prevent the theft.

In the third embodiment, the security unit includes the door 440 with the dial lock, the slide pin 444, and the dial 446. However, the present invention is not limited thereto. For example, the button 432 may be manipulated by shading a mobile phone and a smart phone or shading an apparatus emitting a predetermined electromagnetic wave.

Fourth Embodiment

Next, a fourth embodiment of the present invention will be described with reference to FIG. 14.

This embodiment relates to a method of enabling a disabled vehicle to be searched easily by a collection vehicle when a failure part of the disabled vehicle is a wireless communication unit 402 (FIG. 2) in the autonomous movement system 10 according to the first to third embodiments. In the fourth embodiment, because a configuration and a process of the autonomous movement system 10 are the same as those of the first embodiment, the description is omitted.

Figure 14:
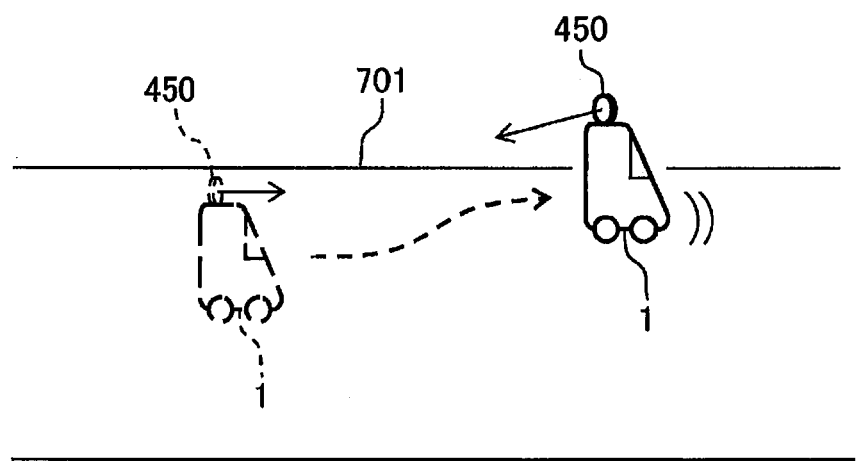
FIG. 14 is a diagram illustrating a method of stopping a disabled vehicle according to a fourth embodiment.

FIG. 14 is a diagram illustrating a method of stopping the disabled vehicle according to the fourth embodiment.

In an autonomous moving apparatus 1, a reflection plate (notifying unit) 450 of a predetermined pattern is attached to an upper portion. The reflection plate 450 turns to the front at the time of normal travel. In addition, even when a failure detecting unit 124 (FIG. 2) detects failure and movement to a road shoulder starts, the reflection plate 450 of the autonomous moving apparatus 1 turns to the front. If the autonomous moving apparatus 1 moves to the road shoulder, a travel processing unit 108 of the autonomous moving apparatus 1 makes the reflection plate 450 turn to a direction of a position where the failure has been detected. In addition, the travel processing unit 108 of the autonomous moving apparatus 1 may make the reflection plate 450 turn to a direction of a spot where a position of an own vehicle has been transmitted to a control device 3 lastly. Meanwhile, a search processing unit 120 of a collection vehicle emits light from a light emitting unit (not illustrated in the drawings) to a surrounding portion and searches a reflection pattern by the reflection plate 450 by a camera (not illustrated in the drawings). In this way, the collection vehicle searches a disabled vehicle.

According to the fourth embodiment, even when the disabled vehicle cannot transmit a failure waiting position to the control device 3 by failure of a wireless communication unit 402 and when the collection vehicle performs the search on the basis of final position information of the disabled vehicle provided from the control device 3, the disabled vehicle make the reflection plate 450 turn to a direction where the disabled vehicle can be easily recognized by the collection vehicle, as a mark. Therefore, the collection vehicle can easily discover the disabled vehicle.

In addition, in this embodiment, the reflection plate 450 is used. However, the present invention is not limited thereto. For example, light may be flickered with a constant pattern, like an electric bulletin board.

Fifth Embodiment

Next, a fifth embodiment of the present invention will be described with reference to FIG. 15.

In the fifth embodiment, a method of preventing a disabled vehicle from colliding with a surrounding portion, when the disabled vehicle is towed and collected in the autonomous movement system 10 according to the first to fourth embodiments, will be described.

Figure 15:
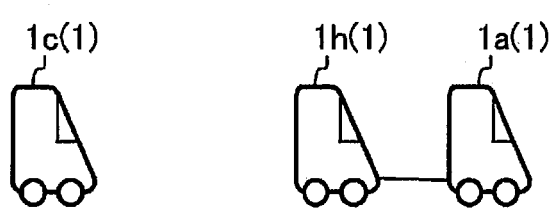
FIG. 15 is a diagram illustrating an operation when a disabled vehicle is towed and collected in accordance with a fifth embodiment.

FIG. 15 is a diagram illustrating an operation when the disabled vehicle is towed and collected in accordance with the fifth embodiment.

First, if a control device 3 detects failure of an autonomous moving apparatus 1, the control device 3 allocates at least two vehicles of a collection vehicle 1a (autonomous moving apparatus 1) and a safety confirmation vehicle 1c (autonomous moving apparatus 1) to a location of a disabled vehicle 1b (autonomous moving apparatus 1), for collection work. In addition, if the collection vehicle 1a discovers the disabled vehicle 1b, the collection vehicle 1a is connected to the disabled vehicle 1b using the method described in the first embodiment and tows the disabled vehicle 1b. During the towing, the safety confirmation vehicle 1c travels at the back of the disabled vehicle 1b. During the collection work, the collection vehicle 1a monitors collision with an obstacle at the front side and the front side of the lateral side of the disabled vehicle 1b, by an environment recognizing unit 104 (FIG. 2) such as a camera. Meanwhile, the safety confirmation vehicle 1c monitors collision with an obstacle at the rear side and the rear side of the lateral side of the disabled vehicle 1b.

When the collision of the disabled vehicle 1b is predicted by the collection vehicle 1a, a travel processing unit 108 (FIG. 2) of the collection vehicle 1a stops the disabled vehicle 1b and transmits a stop command to the safety confirmation vehicle 1c through the control device 3. Likewise, when the collision of the disabled vehicle 1b is predicted by the safety confirmation vehicle 1c, the travel processing unit 108 (FIG. 2) of the safety confirmation vehicle 1C transmits the stop command to the collection vehicle 1a through the control device 3 and the safety confirmation vehicle 1c is also stopped.

According to the fifth embodiment, the disabled vehicle 1b can be prevented from colliding with the surrounding portion during the collection work. In this way, safety can be improved during the collection work or towing of the disabled vehicle 1b.

The present invention is not limited to the embodiments described above and various modifications are included in the present invention. For example, the embodiments are described in detail to facilitate the description of the present invention and are not limited to embodiments in which all of the described configurations are included. In addition, a part of the configurations of the certain embodiment can be replaced by the configurations of another embodiment or the configurations of another embodiment can be added to the configurations of the certain embodiment. In addition, for a part of the configurations of the individual embodiments, other configurations can be added, deleted, and replaced.

In addition, a part or all of the individual configurations, the individual functions, the path generating unit 106, the travel processing unit 108, the search processing unit 120, the collection processing unit 122, the map database 150, the vehicle allocation position managing unit 304, the state managing unit 306, and the vehicle allocation information database 350 may be designed by integrated circuits and may be realized by hardware. In addition, as illustrated in FIGS. 3, 4, and 11, the individual configurations and the individual functions may be realized by software by analyzing programs for realizing the functions by a processor such as the CPUs 408 and 314 and executing the programs by the processor. Information such as the programs, the tables, and the files for realizing the individual functions and the data may be stored in the memories 406 and 312 as illustrated in FIGS. 3, 4, and 11. In addition, the information may be stored in a recording device such as a solid state drive (SSD) or a recording medium such as an integrated circuit (IC) card, a secure digital (SD) card, and a digital versatile disc (DVD).

In addition, in the individual embodiments, only control lines or information lines necessary for explanation are illustrated and the control lines or information lines do not mean all control lines or information lines necessary for a product. In actuality, almost all configurations may be connected to each other.

REFERENCE SIGNS LIST

1 autonomous moving apparatus
2 main facility
3 control device
10 autonomous movement system
31 control station
102 wireless communication unit (autonomous moving apparatus)
104 environment recognizing unit
106 path generating unit
108 travel processing unit (stop processing unit)
110 driving unit
112 braking unit
114 wheels
116 wheel locking unit
118 wheel lock releasing unit
119 manipulation unit
120 search processing unit
122 collection processing unit
124 failure notifying unit
150 map database
302 wireless communication unit (control device)
304 vehicle allocation position managing unit
306 state managing unit
350 vehicle allocation information database
402 wireless device
404 environment sensor 406 memory (autonomous moving apparatus)
408 CPU (autonomous moving apparatus)
410 motor
418 electromagnetic clutch
420 spring
422a, 422b, 422c wire (wheel lock releasing unit)
426 gear
428 knob (manipulation unit)
424, 424b lever mechanism (wheel lock releasing unit)
430 towing device (towing unit)
432 button (manipulation unit)
440 door with dial lock (security unit)
444 slide pin (security unit)
446 dial (security unit)
450 reflection plate (notifying unit)

The invention claimed is:

1. An autonomous moving apparatus, comprising:
a plurality of wheels;
an electromagnetic clutch which locks the wheels at a time when the autonomous moving apparatus stops;
a manipulation unit which is provided at a location where mechanical manipulation thereof is enabled from outside of the autonomous moving apparatus; and
a wheel lock releasing unit which includes a first wire connected to the manipulation unit, a lever connected to the first wire, and a second wire connected to the lever and the electromagnetic clutch, and the wheel lock releasing unit releases the lock of the wheels when the manipulation unit is mechanically manipulated by a force applied to the manipulation unit from the outside of the autonomous moving apparatus and transmitted to the electromagnetic clutch by the second wire.

2. The autonomous moving apparatus according to claim 1, wherein the wheel lock releasing unit releases the lock of the wheels when the force applied to the manipulation unit is equal to or more than a predetermined value, and maintains the lock of the wheels when the force applied to the manipulation unit is less than the predetermined value.

3. The autonomous moving apparatus according to claim 2,
wherein the manipulation unit is a knob,
wherein the force applied to the knob is a pulling force which causes the wheel lock releasing unit to release the lock of the wheels, and the wheel lock releasing unit includes a spring which returns the knob to a state to maintain the lock of the wheels when the pulling force is stopped, and
wherein a force to move the autonomous moving apparatus is more than the pulling force applied to the knob to release the lock of the wheels.

4. The autonomous moving apparatus according to claim 3,
wherein the knob is configured to have a towing unit inserted therein to tow the autonomous moving apparatus by another autonomous moving apparatus.

5. The autonomous moving apparatus according to claim 2,
wherein the manipulation unit is a button,
wherein the force applied to the button is a pressing force which causes the wheel lock releasing unit to release the lock of the wheels, and the wheel lock releasing unit includes a spring which returns the button to a state to maintain the lock of the wheels when the pressing force is stopped, and
wherein a force to move the autonomous moving apparatus is more than the pressing force applied to the button to release the lock of the wheels.

6. The autonomous moving apparatus according to claim 5, further comprising:
a security unit which enables manipulation of the button by performing a predetermined manipulation.

7. An autonomous movement system comprising:
an autonomous moving apparatus performing autonomous movement; and
a control device monitoring a state of the autonomous moving apparatus and transmitting an instruction to the autonomous moving apparatus,
wherein the autonomous moving apparatus includes:
a plurality of wheels;
an electromagnetic clutch which locks the wheels at a time when the autonomous moving apparatus stops,
a manipulation unit which is provided at a location where mechanical manipulation thereof is enabled from outside of the autonomous moving apparatus, and
a wheel lock releasing unit which includes a first wire connected to the manipulation unit, a lever connected to the first wire, and a second wire connected to the lever and the electromagnetic clutch, and the wheel lock releasing unit releases the lock of the wheels when the manipulation unit is mechanically manipulated by a force applied to the manipulation unit from the outside the autonomous moving apparatus and transmitted to the electromagnetic clutch by the second wire.

8. The autonomous movement system according to claim 7,
wherein the wheel lock releasing unit releases the lock of the wheels when the force applied to the manipulation unit is equal to or more than a predetermined value, and maintains the lock of the wheels by the wheel locking unit when the force applied to the manipulation unit is less than the predetermined value.

9. The autonomous movement system according to claim 7,
wherein the autonomous moving apparatus includes a processor connected to a memory which stores instructions, that when executed by the processor, causes the processor to:
select a stop position when a failure is detected in the autonomous moving apparatus according to a failed part of the autonomous moving apparatus.

10. The autonomous movement system according to claim 7,
wherein the autonomous moving apparatus includes a processor connected to a memory which stores instructions, that when executed by the processor, causes the processor to:
acquire surrounding environment information,
move the autonomous moving apparatus to a road shoulder, and
stop the autonomous moving apparatus posterior to a disabled autonomous moving apparatus located on the road shoulder, on the basis of the environment information.

11. The autonomous movement system according to claim 10,
wherein the memory further stores instructions, that when executed by the processor, causes the processor to:
transmit a notification that the autonomous moving apparatus itself has failed.

12. The autonomous movement system according to claim 7, wherein the autonomous moving apparatus includes a processor connected to a memory which stores instructions, that when executed by the processor, causes the processor to:

search for another autonomous moving apparatus stopped by failure, and when the control device receives a notification showing that the other autonomous moving apparatus is stopped by the failure, from the other autonomous moving apparatus stopped by the failure, the control device transmits information regarding a position of the other autonomous moving apparatus stopped by the failure to the autonomous moving apparatus.

13. The autonomous movement system according to claim 7, wherein the manipulation unit is a knob, wherein the force applied to the knob is a pulling force which causes the wheel lock releasing unit to release the lock of the wheels, wherein the autonomous moving apparatus includes a towing unit insertable into a corresponding knob of another autonomous moving apparatus to tow the other autonomous moving apparatus, wherein the autonomous moving apparatus includes a processor connected to a memory which stores instructions, that when executed by the processor, causes the processor to:

acquire surrounding environment information, another autonomous moving apparatus, and when the autonomous moving apparatus travels while towing the other autonomous moving apparatus by the towing unit, detect an obstacle, on the basis of the environment information.

14. The autonomous movement system according to claim 13, wherein the memory further stores instructions, that when executed by the processor, causes the processor to:

when the autonomous moving apparatus itself is being towed, detect an obstacle, on the basis of the environment information.

\* \* \* \* \*